Jan. 17, 1933.   W. F. SWEZEY   1,894,285
REFRIGERATING APPARATUS
Filed Sept. 26, 1929
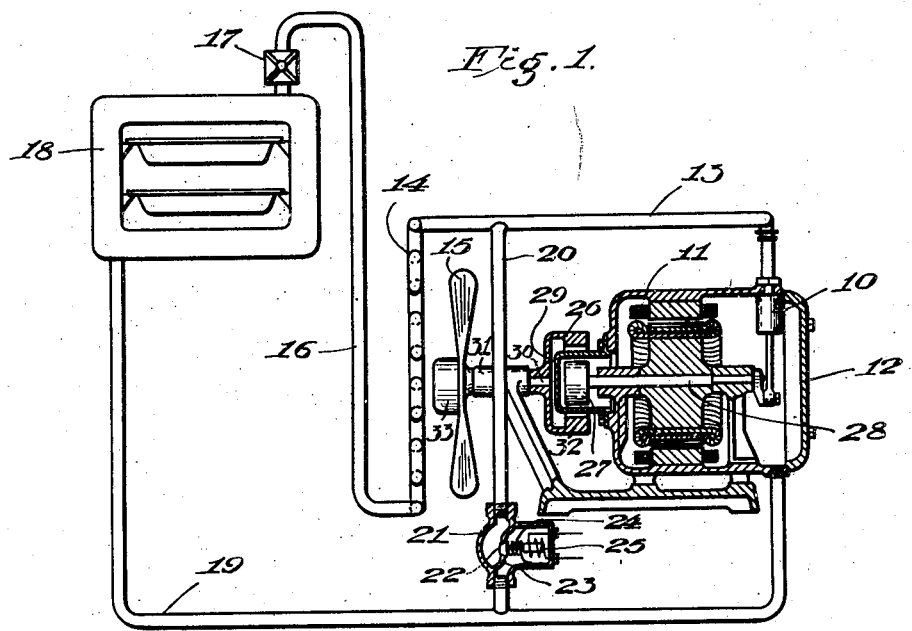
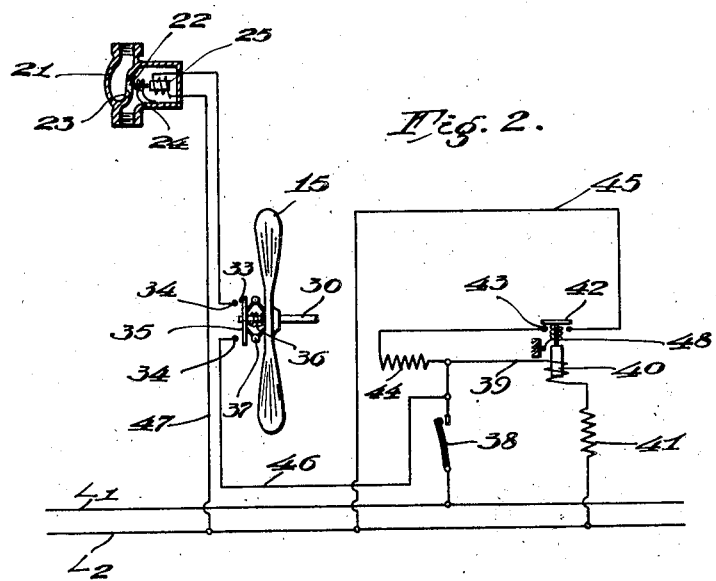
INVENTOR
William F. Swezey.
BY
ATTORNEY Patented Jan. 17, 1933

1,894,285

UNITED STATES PATENT OFFICE

WILLIAM F. SWEZEY, OF SWISSVALE, PENNSYLVANIA, ASSIGNOR TO WESTINGHOUSE ELECTRIC & MANUFACTURING COMPANY, A CORPORATION OF PENNSYLVANIA

REFRIGERATING APPARATUS

Application filed September 26, 1929. Serial No. 395,220.

My invention relates to refrigerating apparatus of the compression type, and particularly to devices for automatically relieving the load from the compressor during the starting period, in order that the required starting torque may be kept as low as possible.

It is an object of the invention to provide apparatus of this character which will operate automatically and without the attention of an operator, for an indefinite time.

Another object is to provide apparatus which will permit direct communication between the high and low pressure side of a refrigerating apparatus at starting, whereby to permit equalization of the suction and discharge pressures of the compressor during this period, and which, at other times will maintain an effective seal between these two portions.

A further object is to provide an apparatus of the described character which is particularly adapted to be applied to a system in which the motor and compressor are enclosed in a hermetically sealed casing.

Other objects and advantages of the invention will be apparent from the following description and accompanying drawing, wherein:

Figure 1 is a schematic view, partly in section, of a refrigerating apparatus embodying my invention, and Fig. 2 is a wiring diagram of the apparatus shown in Fig. 1.

Referring to the drawing for a detailed description of the invention, 10 represents a compressor driven by a motor 11. The motor and compressor are enclosed within a hermetically sealed casing 12. Refrigerant gas compressed by the compressor 10 is carried by a conduit 13 to the condenser 14. The condenser is cooled by a stream of air forced through it by means of a fan 15. The condensed refrigerant is conducted from the condenser by conduit 16, to an expansion valve 17 and thence to the evaporator 18, where it expands and absorbs heat from the surrounding atmosphere. The expanded refrigerant is withdrawn from the evaporator through conduit 19, which returns the gas to the casing 12 where it is again compressed by the pump 10.

Communication between the high pressure conduit 13 and the low pressure conduit 19 is provided by means of conduit 20. This conduit contains a valve body 21 provided with a valve 22 and a seat 23. Valve 22 is normally maintained in its closed position by a spring 24. The valve is momentarily unseated during the starting of the compressor, by means of a solenoid 25, in a manner to be hereafter described.

The fan 15 which cools the condenser, is located outside the sealed casing 12, but is driven by means of the motor 11, located within the casing, through a magnetic coupling 26. Broadly, the magnetic coupling comprises a permanent magnet 27 fixed to one end of the motor shaft 28, and within the casing 12. The portion of the casing wall located adjacent the magnet 27 comprises a cup-shaped nonmagnetic diaphragm 29. The fan shaft 30 is mounted in a bearing 31, and carries on the end opposite that on which the fan is mounted, a cup-shaped conducting member 32, which surrounds the diaphragm 29. Magnet 27 comprises the driving member, and member 32 comprises the driven member of the magnetic coupling 26. When the motor 11 is operating, magnet 27 is rotated, and by induction causes member 32 to rotate, thereby driving the fan 15.

The speed of the fan is in a direct ratio to the speed of the motor and I utilize this fact in controlling the operation of the by-pass valve 22. A centrifugal switch 33 is mounted on the fan shaft 30 adjacent the fan. This switch is shown diagrammatically in Figure 2 as comprising fixed contacts 34 and a movable bridging contact member 35. When the fan shaft is at rest, member 35 closes the circuit through contacts 34, and is held in circuit closing position by a spring 36. When the fan shaft reaches a predetermined speed, which may be determined by the tension of spring 36, the weight-actuated toggle 37 overcomes the force of the spring and causes the contact member 35 to move to the right (Fig. 2) thereby breaking the circuit through contacts 34. It will be apparent that any suitable centrifugal switch may be used for the purpose of controlling the circuit through contacts 34, and that the form I have shown and described is illustrative and diagrammatic only. The centrifugal switch 33 is in series with the valve-opening solenoid 25 and when the switch is closed, a circuit is completed through the switch and solenoid.

Figure 2 shows the application of my invention in connection with a split-phase induction motor. Current passes from line conductor $L_1$, through thermostat 38, conductor 39, solenoid 40, and running winding 41 to line conductor $L_2$. The initial surge of current through the running winding is sufficiently strong to energize solenoid 40 and cause it to move relay 42 to bridge contacts 43. Thereupon a circuit is closed through the starting winding 44 and conductor 45 to conductor $L_2$. When thermostat 38, which is responsive to the temperature of the space to be cooled, is closed, current likewise passes from line conductor $L_1$ through the thermostat, conductor 46, centrifugal switch 33, valve-opening solenoid 25 and conductor 47 to line conductor $L_2$.

After the initial surge of current through the running winding has died down, the solenoid 40 is sufficiently deenergized to permit the spring 48 to bias relay 42 to open position, thereby deenergizing the starting winding. At this time the motor will be approximately at its normal running speed as will likewise be the fan. The centrifugal switch controlling the valve solenoid 25 should be set to open at this point, thereby permitting the valve to seat and prevent communication between the high and low pressure sides of the system, whereby the compressor will assume its load.

If it is so desired, the centrifugal switch can be set to open before or after the starting winding has been released, so that the time at which the compressor assumes its load can be accurately controlled according to the conditions under which the machine is operating. The location of the centrifugal switch outside the sealed casing renders it instantly accessible for adjustment or repairs.

While I have shown and described a single embodiment of my invention, it will be apparent that other forms might be adopted, all coming within the scope of the appended claims.

I claim as my invention:

1. In a refrigerating apparatus, a compressor, a driving motor therefor, a sealed casing enclosing the motor and compressor, an evaporator and a condenser, a rotating element outside the casing, a fan driven by said element for cooling the condenser, means for unloading the compressor at predetermined times, said means being controlled by said rotating element.

2. In a refrigerating apparatus, a compressor, a driving motor therefor, a sealed casing enclosing the motor and compressor, an evaporator and a condenser, a rotating element outside the casing, a fan driven by said element for cooling the condenser, means for unloading the compressor at predetermined times, and means operative with the rotating element for controlling said load releasing means.

3. In a refrigerating apparatus, a compressor, a driving motor therefor, a sealed casing enclosing the motor and compressor, an evaporator and a condenser, a rotating element outside the casing, a fan driven by said element for cooling the condenser, means for unloading the compressor at predetermined times, and a centrifugal switch actuated by the rotating element for controlling said load releasing means.

4. In a refrigerating apparatus, a compressor, a driving motor therefor, a sealed casing enclosing the motor and compressor, an evaporator and a condenser, a rotating element outside the casing, a fan driven by said element for cooling the condenser, means for releasing the compressor load at predetermined times, said means comprising a solenoid-operated valve, and a centrifugal switch actuated by the rotating element for controlling said valve.

5. In a refrigerating apparatus, a compressor and a driving motor therefor, a sealed casing enclosing said motor and compressor, a condenser and an evaporator, a fan for cooling the condenser, means for releasing the load from the compressor when the motor is started and means actuated by rotation of the fan for controlling said load-releasing means.

6. In a refrigerating apparatus, a compressor and a driving motor therefor, a sealed casing enclosing said motor and compressor, a condenser and an evaporator, a fan for cooling the condenser, means for releasing the load from the compressor when the motor is started and a centrifugal switch actuated by rotation of the fan for controlling said load releasing means.

7. In a refrigerating apparatus, a compressor and a driving motor therefor, a sealed casing enclosing said motor and compressor, a condenser and an evaporator, a fan for cooling the condenser, means for releasing the load from the compressor when the motor is started, said means comprising a passageway between the high and low pressure sides of the apparatus, a valve normally closing said passageway, and means controlled by rotation of the fan for opening the valve when the compressor is started.

8. In a refrigerating apparatus, a compressor and a driving motor therefor, a sealed casing enclosing said motor and compressor, a condenser and an evaporator, a fan for cooling the condenser, means for releasing the load from the compressor when the motor is started and means outside the casing and responsive to the speed of the motor, for controlling said load-releasing means.

9. In a refrigerating apparatus, a motor, a compressor, a sealed casing containing the motor and compressor, an evaporator and a condenser means for releasing the load from the compressor when the motor is started, said means including a rotating element outside the casing and driven by said motor, said rotating element including a fan for cooling the condenser.

10. In a refrigerating apparatus, a motor, a compressor, a sealed casing containing the motor and compressor, an evaporator and a condenser, a fan for cooling the condenser, means for releasing the load from the compressor when the motor is started, said means including a centrifugal switch outside the casing attached to the fan and driven by said motor.

In testimony whereof, I have hereunto subscribed my name this 17th day of September 1929.

WILLIAM F. SWEZEY.